United States Patent
Kim

(10) Patent No.: US 7,120,116 B2
(45) Date of Patent: Oct. 10, 2006

(54) METHOD AND APPARATUS FOR ASSIGNING PACKET RESOURCES OF WIRELESS LOCAL LOOP (WLL)

(75) Inventor: Jong Tak Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 975 days.

(21) Appl. No.: 09/993,519

(22) Filed: Nov. 27, 2001

(65) Prior Publication Data

US 2002/0064160 A1 May 30, 2002

(30) Foreign Application Priority Data

Nov. 28, 2000 (JP) ............................... 2000-71150

(51) Int. Cl.
*H04L 12/56* (2006.01)
(52) U.S. Cl. ...................... 370/235; 370/352
(58) Field of Classification Search ............ 370/352, 370/356, 235
See application file for complete search history.

(56) References Cited

U.S. PATENT DOCUMENTS 4,974,256 A * 11/1990 Cyr et al. .............. 379/112.04
6,928,482 B1 * 8/2005 Nun et al. ................. 709/235

OTHER PUBLICATIONS

Ferrer et al. "Overview and Capacity of the GPRS (General Packet Radio Service)". IEEE Sep. 8-11, 1998. pp. 106-110.*

* cited by examiner

*Primary Examiner*—Derrick Ferris
(74) *Attorney, Agent, or Firm*—Fleshner & Kim LLP.

(57) ABSTRACT

A call connection is supported by first receiving a call connection request. After the call connection request is received, the loads supported by a plurality of packet processors are compared. The call connection is then assigned to the packet processor having a load that is no larger than the load supported by any other of the plurality of packet processors.

22 Claims, 5 Drawing Sheets

METHOD AND APPARATUS FOR ASSIGNING PACKET RESOURCES OF WIRELESS LOCAL LOOP (WLL)

BACKGROUND OF THE INVENTION

1. Field of the Invention

The present invention relates to a method for assigning a data service call of a wireless local loop (WLL) system and, more particularly, to a method for assigning packet resources of the WLL system supporting the data service call in consideration of the load amount of a packet processing apparatus.

2. Background of the Related Art

A data transmission method of a wireless communication system is divided into a circuit method and a packet method. In the circuit method, when a base station receives the call connection request of terminals and assigns the call to an empty channel, the assigned channel is exclusively used by the call until contact is cut off In the packet method, the exclusive occupation of a channel is eliminated. When the base station receives the call connection request of terminals and assigns the call to an arbitrary packet processing processor, the assigned call monopolizes a channel only when there is data to be transmitted. When the data transmission is completed, the channel is changed to be idle and is allowed to be occupied by the call that approaches first.

The call transmitted from the terminal is speech (or character) data. The data is divided into a plurality of data items, each having a uniform length, so that they may be easily transmitted. Additionally, the data items are formed into a packet that is a data transmission unit. The packet includes the speech (character) information, transmission information, control information, and the address of a destination. These information elements are required for a wireless communication.

FIG. 1 shows the process of assigning the call in the circuit method. First, it is assumed that terminals 10, 20, and 30 are sequentially connected to a base station 80. When the terminal 10 tries to connect the call to the base station 80, a call assignment processor 40 detects an empty channel in a modem card 50 of the base station 80 and assigns the call to the empty channel. The calls of the terminal 10, which are sequentially tried to be connected to the remaining terminals 20 and 30, are assigned to the empty channels of the modem card 50 in the base station 80. At this time, the channels assigned to the respective terminals 10, 20, and 30 are monopolized until the connection of the calls is cut off by the corresponding terminal. The setting of the calls is maintained without the transmission of actual data.

FIG. 2 shows the process of sequentially assigning calls in a packet method. It is assumed that terminals 110, 120, and 130 are sequentially connected to a base station 180, that the load amount of a packet processing processor 160 is larger than the load amount of a packet processing processor 170, that a terminal is connected to the packet processing processor 160, and that two terminals are connected to the packet processing processor 170.

A call assignment processor 140 alternately and sequentially assigns the calls of the connected terminals 110, 120, and 130 to the respective packet processing processors 160 and 170 of packet board 150. The above assumed conditions, such as the current load amount of the packet processing processors 160 and 170 and the number of connected terminals, do not affect the performance of the present method.

When terminal 110 connects the call, which is assigned to the packet processing processor 160, the call of terminal 120, which is connected next in time, is assigned to the packet processing processor 170. The call of terminal 130, which is connected next in time, is assigned to the packet processing processor 160. When the number of packet processing processors is two, the calls are alternately assigned. When a plurality of packet processing processors operate, the calls are sequentially assigned.

"Sequentially" means that the call assignment processor 140 gives an equal call processing chance to the packet processing processor 160, according to the position of the packet processing processor as hardware or in the operation order of the packet processing processor as software.

FIG. 3 shows the process of assigning the calls according to the number of connected terminals in the packet method. It is assumed that terminals 210, 220, and 230 are sequentially connected to a base station 280, that the load amount of a packet processing processor 260 is larger than the load amount of the packet processing processor 270, two terminals are connected to the packet processing processor 260, and one terminal is connected to the packet processing processor 270.

In the method of assigning the calls according to the number of connected terminals, the number of terminals assigned to the packet processing processor 260 is compared with the number of terminals assigned to the packet processing processor 270, by call assignment processor 240, and a new call is assigned to the packet processor having a smaller number of terminals assigned to it. Because only the number of connected terminals is considered in the present method, it matters when a small number of calls are processed by the packet processing processor because the load amount of the packet processing process is large. In an embodiment according to the assumed conditions, a new call is assigned to the packet processing processor 260. Then, the number of terminals connected to the packet processing processor 260 is equal to the number of terminals connected to the packet processing processor 270. However, the load amount of the packet processing processor 260 is significantly different from the load amount of the packet processing processor 270.

When the number of terminals connected to the packet processing processor 260 is equal to the number of terminals connected to the packet processing processor 270, the calls of a newly connected terminal 220 are assigned by the method of sequentially assigning the calls. Therefore, the calls are assigned to the packet processing processor 260. The calls of the terminal 230 connected next in time are assigned to the packet processing processor 270, to which a smaller number of terminals are connected.

The methods of sequentially assigning the calls and of assigning the calls according to the number of connected terminals have the following problems.

In the case of the method of sequentially assigning the calls, because the two packet processing processors 160 and 170 sequentially receive the calls, the calls are appropriately assigned. However, if the load amount of the packet processing processor 160 is small because most of the calls assigned to the packet processing processor 160 are cut off and the load amount of the packet processing processor 170 increases because most of the calls assigned to the packet processing processor 170 still transmit and receive data, the method of sequentially assigning the calls imposes a heavier burden on the packet processing processor 170. This deteriorates the efficiency of the system.

In the case of the method of assigning the calls according to the number of connected terminals, the number of terminals connected to the packet processing processor 260 and the load amount of the packet processing processor 260 are not equal to the number of terminals connected to the packet processing processor 270 and the load amount of the packet processing processor 270. For example, let's assume that five terminals are connected to the packet processing processor 260 and three terminals are connected to the packet processing processor 270. At this time, even though most of the calls of the packet processing processor 260 are connected, assume little data is transmitted and received. Also, assume the load amount of the packet processing processor 270 is large because data is actively transmitted and received. Further assume a newly connected call is assigned to the packet processing processor 270, whose load amount is large. In this example, the packet processing load is not evenly distributed, causing packet processing processor 270 to support a disproportionate share of the load.

Because each packet processing processor must process a large number of calls in the packet data system, it is important to appropriately assign the calls so that the calls are concentrated to a packet processing processor.

In the circuit method, because each call occupies a channel even though data is not transmitted and received, the efficiency and flexibility in using a circuit is low. In the method of sequentially assigning the calls, the calls are assigned without considering the load amount of the packet processing processor and the number of connected terminals. In the method of assigning the calls according to the number of connected terminals, the calls are assigned to the packet processing processor without considering the load amount of the packet processing processor.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method for assigning packet resources of a wireless local loop (WLL) system, which is capable of assigning calls on the basis of the load amount of each packet processing processor.

A further object of the present invention is to periodically measure the load amount of the packet processing processors to better distribute the call assignments.

To achieve these and other advantages and in accordance with the purpose of the present invention, as embodied and broadly described herein, there is provided a method for assigning packet resources of a wireless local loop (WLL). The method includes receiving a call connection request from a terminal, comparing the load amounts of a plurality of packet processing processors with each other when the call connection request is received, and assigning the call requested to be connected to the packet processing processor whose load amount is smallest among the plurality of packet processing processors.

The objects of the invention may be further achieved in whole or in part by a packet processing device, including a plurality of packet processing means for processing packet data of a communication and a call assignment means for assigning a resource of a particular packet processing means to support the communication. The call assignment means assigns the resource from the particular packet processing means based on a relative resource utilization of the plurality of packet processing means.

The objects of the invention may be further achieved in whole or in part by a communication system, including multiple terminals that each communicate packet data in a call, a plurality of packet processing means for processing the packet data, and a call assignment means for assigning a resource of a particular packet processing means to support the call. The call assignment means assigns the resource from the particular packet processing means having a resource utilization no greater than that of any other of the plurality of packet processing means to support the call.

The objects of the invention may be further achieved in whole or in part by a communication method, including determining a resource utilization of each of multiple packet processing functions, selecting a particular packet processing function based on a relative resource utilization of the packet processing functions, and assigning a resource of the particular packet processing function to support a packet data communication.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
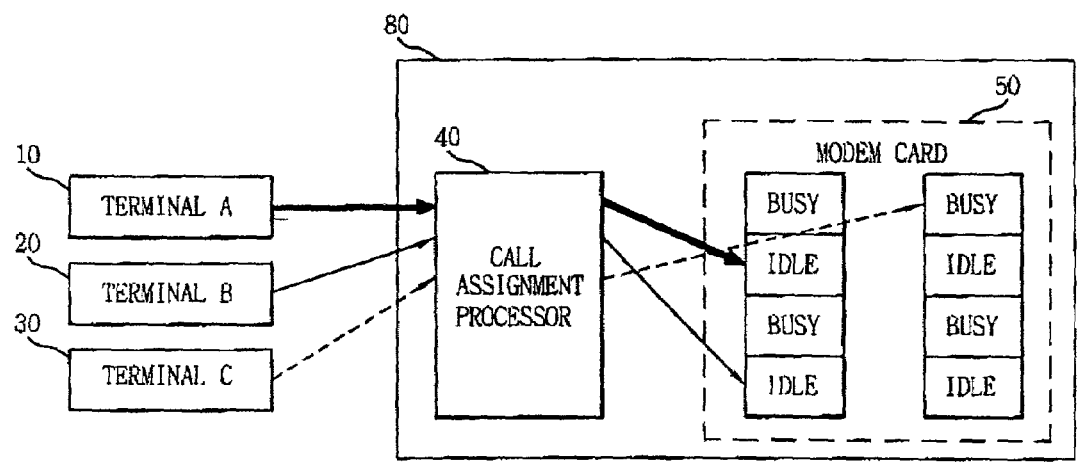
FIG. 1 illustrates the process of assigning calls according to a circuit method.
Figure 2:
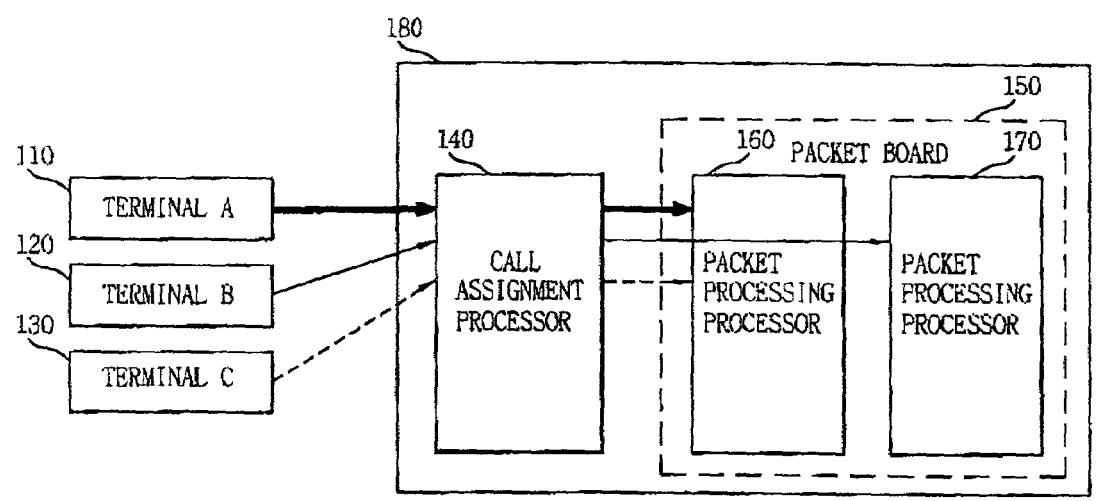
FIG. 2 illustrates the process of sequentially assigning calls according to a packet method.
Figure 3:
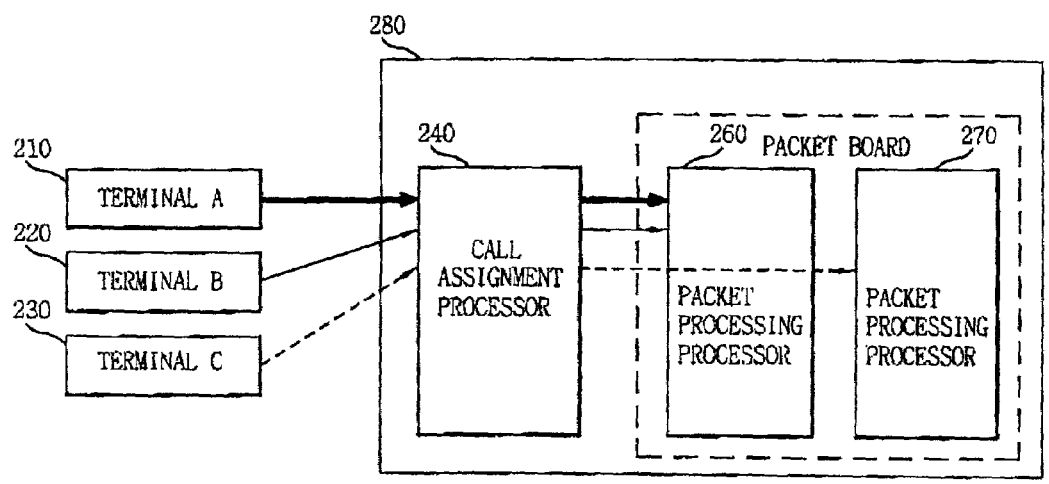
FIG. 3 illustrates the process of assigning calls according to the number of terminals connected in the packet method.
Figure 4:
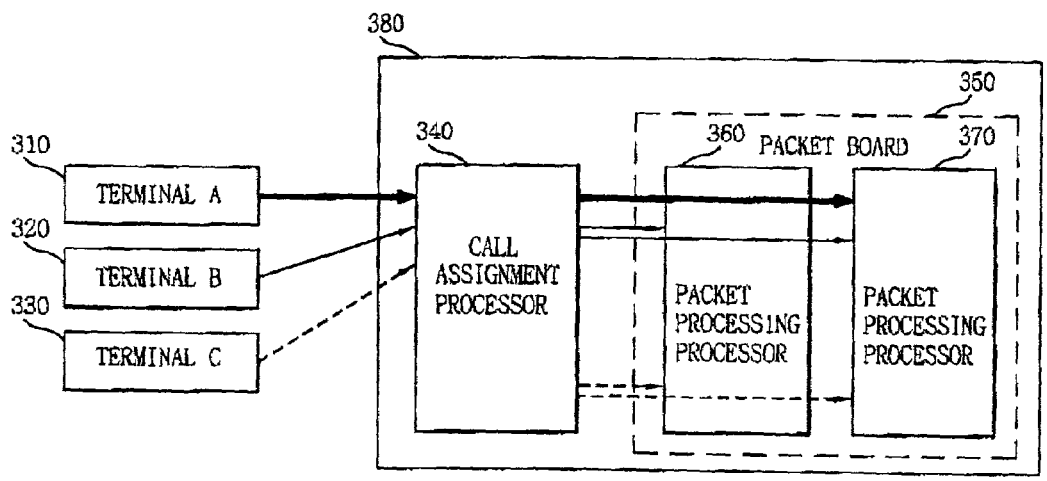
FIG. 4 illustrates the process of assigning calls according to a preferred embodiment of the present invention.

FIG. 4 shows the process of assigning calls according to a preferred embodiment of the present invention. It is assumed that terminals 310, 320, and 330 are sequentially connected to a base station 380, that the load amount of the packet processing processor 360 is larger than the load amount of the packet processing processor 370, that a terminal is connected to the packet processing processor 360, and that two terminals are connected to the packet processing processor 370.

The calls of the newly connected terminal 310 are assigned to the packet processing processor 370 whose load amount is small. The load amount of the packet processing processor 360 is compared with the load amount of the packet processing processor 370. The calls of the terminal 320 connected next time are assigned to the packet processing processor whose load amount is smaller than the load amount of the other packet processing processor. The calls of the terminal 330 connected next time are assigned to the packet processing processor whose load amount is smaller than the load amount of the other packet processing processor.

Therefore, the packet processing processors 360 and 370 of packet board 350 measure and accumulate the packet holding time at regular intervals and periodically report the accumulated packet holding time to a call assignment processor 340. The call assignment processor 340 calculates the load amount from the reported accumulated packet holding time of the packet processing processors 360 and 370 and controls the assignment of the calls so that the calls are not concentrated to a packet processor.

Figure 5A:
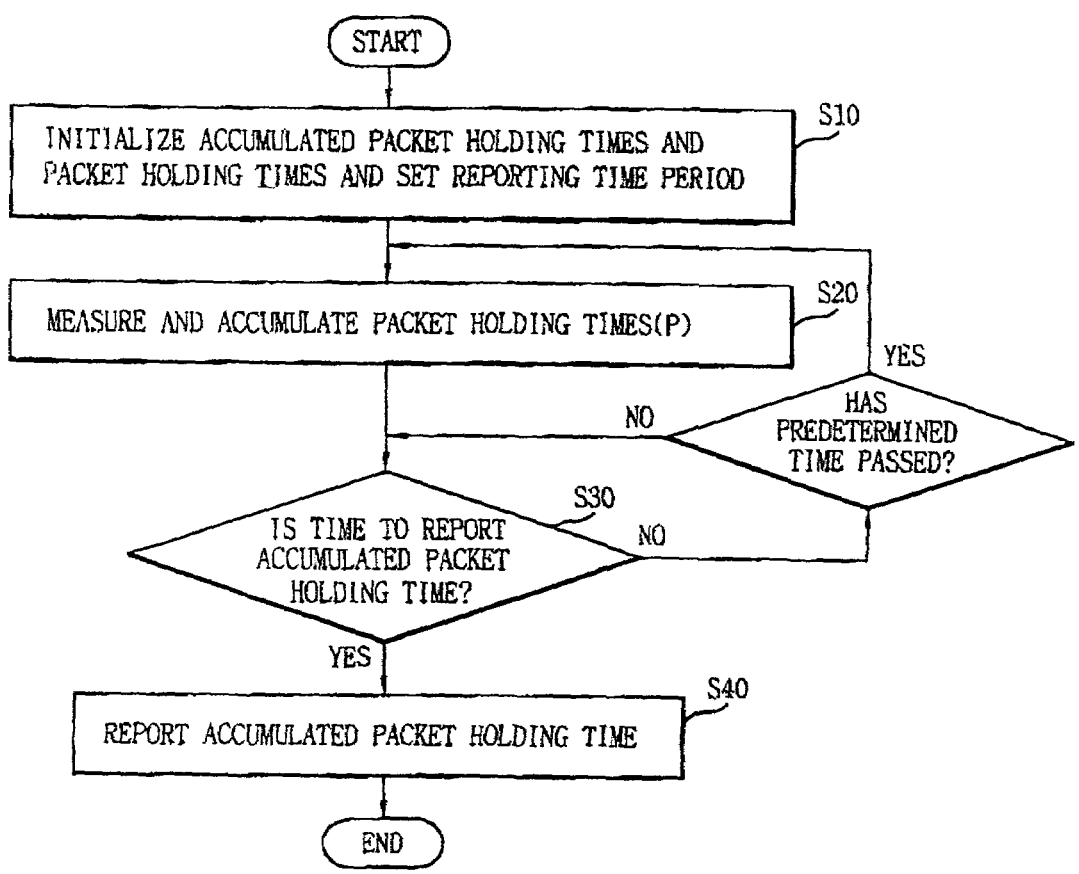
FIG. 5A is a flowchart illustrating the process of measuring and reporting packet holding times according to a preferred embodiment of the present invention.

FIG. 5A is a flowchart showing the process of measuring and reporting the packet holding times according to a preferred embodiment of the present invention. The packet processing processors 360 and 370 initialize the packet holding times and the accumulated packet holding time, determine a report period as set by a user (S10), and measure the packet holding times (S20). The packet processing processors 360 and 370 repeat step S20 at regular intervals and accumulate the measured packet holding times. The packet processing processors 360 and 370 check whether it is time to report the packet holding times (S30).

When it is time to report the packet holding times, the packet processing processors 360 and 370 report the accumulated packet holding time to the call assignment processor 340 (S40). The above processes (S10, S20, S30, and S40) are repeated periodically or occasionally. The call assignment processor 340 calculates the load amounts of the packet processing processors 360 and 370 through the reported accumulated packet holding time.

Figure 5B:
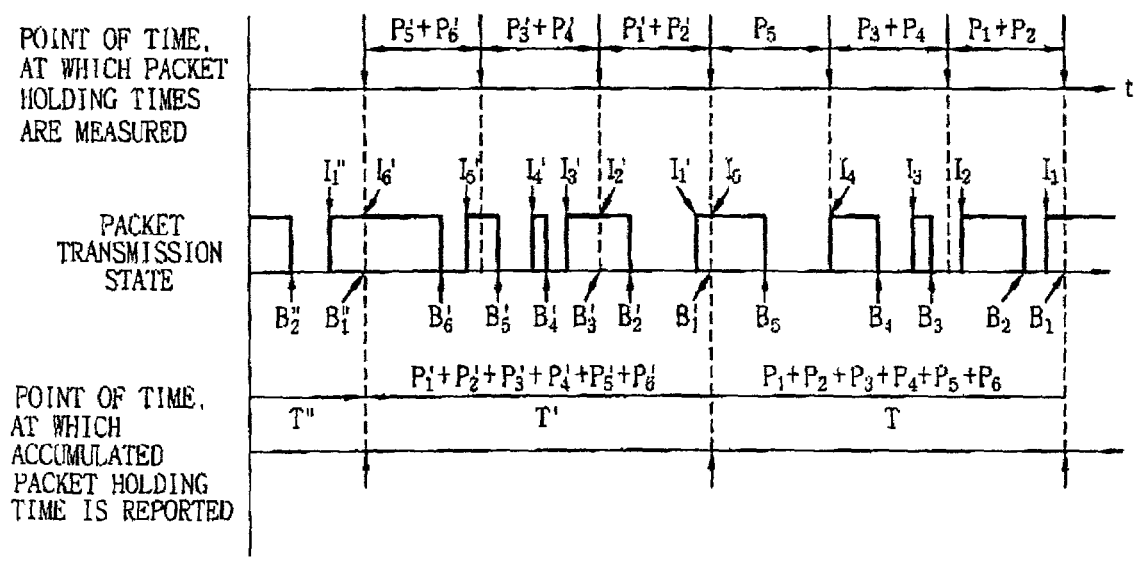
FIG. 5B is a timing diagram illustrating the packet holding times and the busy/idle statuses of the packet processing processor.

FIG. 5B is a timing diagram showing the packet holding times and the busy/idle statuses of the packet processing processor. The packet holding time begins when the transmission of the packet data starts, that is, when the packet processing processors 360 and 370 become busy, and ends when the transmission of the packet data is terminated, that is, when the packet processing processors 360 and 370 become idle. The accumulated packet holding time is obtained by adding the packet holding times, which is expressed as follows.

Packet holding times ($P_n$)=idle state starting times ($I_n$)− busy state starting times ($B_n$) (n=1, 2, and 3 . . . )
Accumulated packet holding time=Σpacket holding times ( ) (n=1, 2, and 3 . . . )
Load amount=accumulated packet holding time/report period ($\Delta T$)

The packet holding time means the time during which the packet processing processor is busy. The accumulated packet holding time is obtained by adding the times during which the packet processing processor 360, 370 is busy and is measured during the report period. The load amounts of the respective packet processing processors are the times during which the packet processing processors are busy, which are measured for a predetermined unit time (report period). The report period can be set differently by a user.

Figure 6:
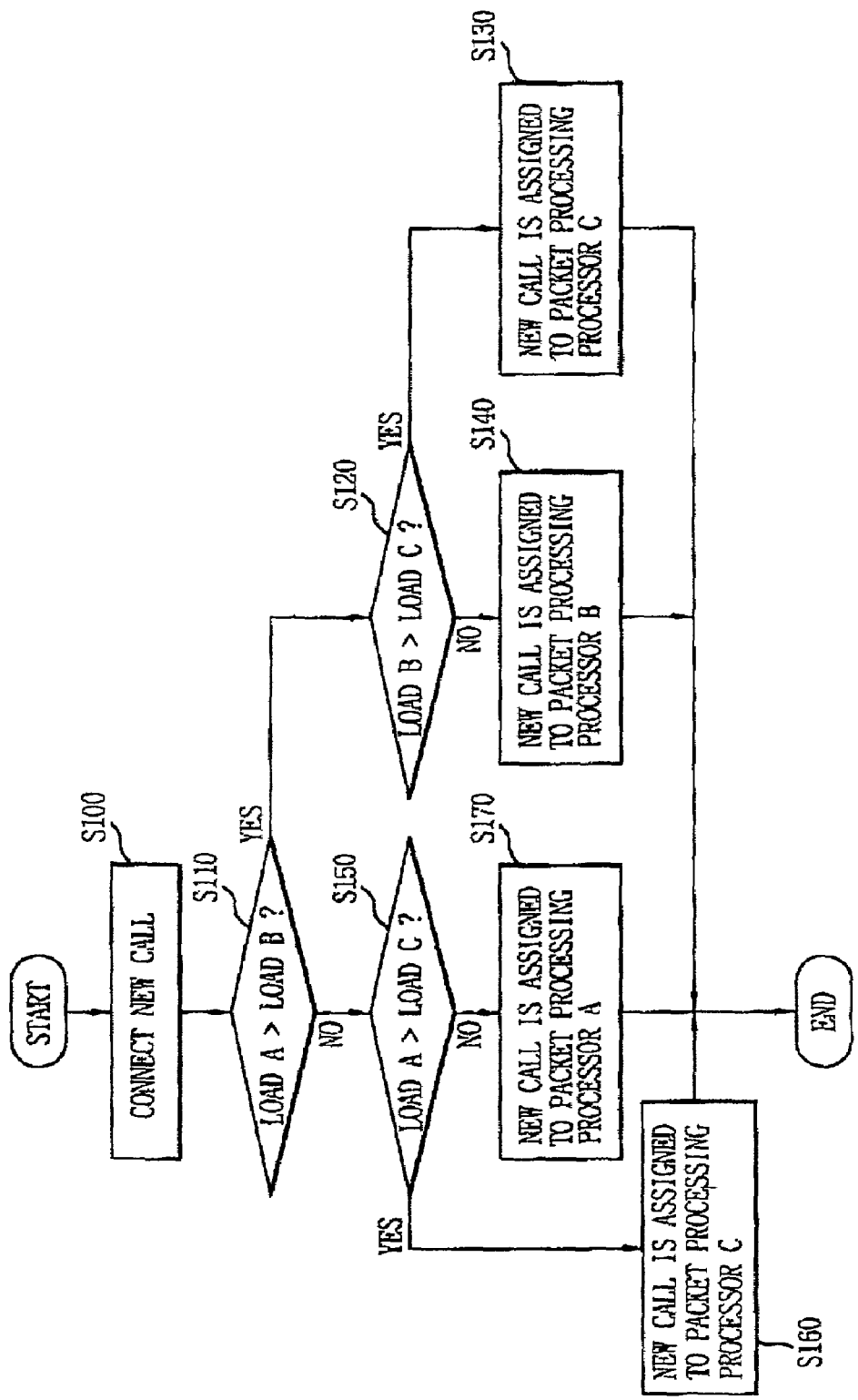
FIG. 6 is a flowchart illustrating the process of assigning the calls according to a preferred embodiment of the present invention.

FIG. 6 is a flowchart showing the process of assigning the calls according to a preferred embodiment of the present invention. When the call assignment processor 340 is requested to connect a new call to a terminal from the terminal (S100), the call assignment processor compares the load amounts of the respective packet processing processors with each other. It is assumed that the number of packet processing processors is 3 (packet processing processors A, B, and C).

The call assignment processor 340 compares the load amount of packet processing processor A with the load amount of packet processing processor B (S110). When the load amount of packet processing processor A is larger than the load amount of packet processing processor B, the call assignment processor 340 compares the load amount of packet processing processor B with the load amount of packet processing processor C (S120). As a result of the step S120, when it is determined that the load amount of packet processing processor B is larger than the load amount of packet processing processor C, a new call is assigned to packet processing processor C (S130). When the load amount of packet processing processor B is smaller than or equal to the load amount of packet processing processor C, the new call is assigned to packet processing processor B (S140).

As a result of step S110, when the load amount of packet processing processor A is smaller than or equal to the load amount of packet processing processor B, the load amount of packet processing processor A is compared with the load amount of packet processing processor C (S150). As a result of step S150, when the load amount of packet processing processor A is larger than the load amount of packet processing processor C, the new call is assigned to packet processing processor C (S160). When the load amount of packet processing processor A is smaller than or equal to the load amount of packet processing processor C, the new call is assigned to packet processing processor A (S170).

Alternatively, when the load amount of packet processing processor A is equal to the load amount of packet processing processor C, the calls of a newly connected terminal 220 are assigned to packet processing processors A, B, and C in the order used in the method of sequentially assigning the calls.

The number of apparatuses and the processing scale described herein are used to simplify the description of the invention. The number of apparatuses used in actual communication service circumstances and the processing scale in the actual communication service circumstances are generally larger and more various than in the described embodiment. The application, the modification, and the change of the method for assigning the packet resources according to the present invention are apparent to anyone skilled in the art.

As mentioned above, according to the present invention, because the processing is based on the load amount, it is possible to prevent the efficiency of the system from deteriorating due to the imbalance of the assignment of calls. Because the call processing processor periodically checks the load amounts of the respective packet processing processors, it is possible to maintain the quality and the speed of the data transmission service, optimally.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A call connection method, comprising:
   receiving a request for a call connection;
   comparing loads supported by a plurality of packet processors; and
   assigning the call connection to a first packet processor having a first load that is no larger than a second load supported by any other of the plurality of packet processors, wherein said comparing includes:
   (a) determining an accumulated packet holding time of each of the plurality of packet processors;
   (b) determining the load supported by each of the plurality of packet processors based on the corresponding accumulated packet holding time; and
   (c) comparing the loads of the respective packet processors, wherein each of the plurality of packet processors reports the respective accumulated packet holding time periodically based on a period set by a user.

2. The method of claim 1, wherein each of the plurality of packet processors measures a packet holding time at a regular interval and reports the corresponding accumulated packet holding time to a call assignment processor.

3. The method of claim 2, wherein the packet holding time is a time difference between a time the respective packet processor becomes busy, due to a transmission of packet data, and a time the respective packet processor becomes idle.

4. The method of claim 1, wherein the load supported by each of the plurality of processors is determined by dividing a corresponding accumulated packet holding time by a report period.

5. The method of claim 1, wherein the call connection is a data services call.

6. The method of claim 1, wherein the call connection is assigned in a predetermined order when multiple packet processors of the plurality of packet processors have equivalent loads that are no larger than the load of any other of the plurality of packet processors.

7. A method for assigning packet resources, comprising:
   receiving a request for a call connection from a terminal;
   determining an accumulated packet holding time for each of a plurality of packet processors;
   comparing loads supported by each of the plurality of packet processors on the basis of their corresponding accumulated packet holding times; and
   assigning the packet resources to support the requested call connection from a first packet processor having a first load that is no larger than a second load supported by any other of the plurality of packet processors, wherein each of the plurality of packet processors reports the respective accumulated packet holding time periodically based on a period set by a user.

8. The method of claim 7, wherein each of the plurality of packet processors measures a packet holding time at a regular interval and reports the corresponding accumulated packet holding time to a call assignment processor.

9. The method of claim 8, wherein the packet holding time is a time difference between a time the respective packet processor becomes busy, due to a transmission of packet data, and a time the respective packet processor becomes idle.

10. The method of claim 7, wherein the load supported by each of the plurality of packet processors is determined by dividing the corresponding accumulated packet holding time by a report period.

11. The method of claim 7, wherein the call connection is a data services call.

12. The method of claim 7, wherein the call connection is assigned in a predetermined order when multiple packet processors have equivalent loads that are no larger than the load of any other of the plurality of packet processors.

13. A packet processing device, comprising:
    a plurality of packet processing circuits each processing packet data of calls carried by a wireless local loop system; and
    a call assignment circuit which assigns resources of the packet processing circuits to support the calls, wherein the call assignment circuit assigns a resource from a particular packet processing circuit based on a relative resource utilization of the plurality of packet processing circuits, the call assignment circuit assigning the resource by:
    receiving an accumulated packet holding time from each of the packet processing circuits;
    determining the resource utilization of each of the packet processing circuits based on a corresponding one of the accumulated packet holding times; and
    comparing the resource utilization of the packet processing circuits, wherein each of the plurality of packet processing circuits reports a corresponding one of the accumulated packet holding times periodically based on a period set by a user.

14. The device of claim 13, wherein the call assignment circuit assigns the resource from the particular packet processing circuit having a corresponding resource utilization no greater than that of any other of the plurality of packet processing circuits.

15. The device of claim 13, wherein the resource utilization is a processing load supported by each of the plurality of packet processing circuits.

16. The device of claim 13, wherein:
    the resource utilization of each of the plurality of packet processing circuits is a processing duty cycle determined by a ratio of a busy time of the respective packet processing circuits to a duty period; and
    the busy time is a cumulative time each of the respective packet processing circuits devotes to processing the packet data during the duty period.

17. A communication system, comprising:
    multiple terminals that each communicate packet data in a call;
    a plurality of packet processing circuits which process the packet data; and
    a call assignment circuit which assigns a resource of a particular packet processing circuit to support the call, wherein:
    each of the plurality of packet processing circuits reports an accumulated packet holding time to the call assignment circuit periodically based on a period set by a user, and
    the call assignment circuit assigns the resource from the particular packet processing circuit based on the reported accumulated packet holding times from the packet processing circuits, the resource being assigned to one of the plurality of packet processing circuits having a dynamically changing resource utilization no greater than that of any other of the plurality of packet processing circuits to support the call.

18. A communication method, comprising:
    determining a processing utilization of resources of each of multiple packet processing functions;

selecting a particular packet processing function based on relative processing utilization of resources of the packet processing functions; and assigning a resource of the particular packet processing function to support a packet data communication, said determining including:

receiving an accumulated packet holding time from each of the packet processing functions, the processing utilization of resources of the packet processing functions being determined based on corresponding ones of the accumulated packet holding times; and wherein said selecting includes:

comparing the processing utilization of resources of the packet processing functions, wherein each of the plurality of packet processing functions reports a corresponding one of the accumulated packet holding times periodically based on a period set by a user.

19. The method of claim 18, wherein the particular packet processing function has a corresponding processing utilization of resources no greater than that of any other packet processing functions.

20. The method of claim 18, wherein the processing utilization of resources is a processing load supported by each of the packet processing functions.

21. The method of claim 18, wherein:

the processing utilization of resources of each of the packet processing functions is a processing duty cycle determined by the ratio of the respective packet processing function's busy time to a duty period; and the busy time is a cumulative time the respective packet processing function devotes to processing packet data during the duty period.

22. The method of claim 18, further comprising:

communicating packet data from a first terminal to a second terminal by wireless communication; and processing the packet data using the resource of the particular packet processing function assigned to the packet data communication.

* * * * *